US012771041B2

(12) United States Patent
Singh et al.

(10) Patent No.: US 12,771,041 B2
(45) Date of Patent: Oct. 20, 2026

(54) RECONFIGURABLE METASURFACE WITH INTEGRATED SIGNAL READOUT MECHANISM

(71) Applicant: Dell Products L.P., Round Rock, TX (US)

(72) Inventors: Tejinder Singh, Manotick (CA); Navjot Kaur Khaira, Manotick (CA)

(73) Assignee: Dell Products L.P., Round Rock, TX (US)

(*) Notice: Subject to any disclaimer, the term of this patent is extended or adjusted under 35 U.S.C. 154(b) by 67 days.

(21) Appl. No.: 18/968,803

(22) Filed: Dec. 4, 2024

(65) Prior Publication Data

US 2026/0155579 A1 Jun. 4, 2026

(51) Int. Cl.
*H01Q 15/00* (2006.01)

(52) U.S. Cl.
CPC ....... *H01Q 15/0086* (2013.01); *H01Q 15/002* (2013.01); *H01Q 15/0026* (2013.01)

(58) Field of Classification Search
USPC .......................................................... 343/909
See application file for complete search history.

(56) References Cited

U.S. PATENT DOCUMENTS

| | | | |
|---|---|---|---|
| 3,827,055 | A | 7/1974 | Bogner et al. |
| 3,839,720 | A | 10/1974 | Reindel |
| 4,257,050 | A | 3/1981 | Ploussios |
| 4,814,773 | A | 3/1989 | Wechsberg et al. |
| 7,006,849 | B2 | 2/2006 | Li et al. |

(Continued)

FOREIGN PATENT DOCUMENTS

| | | | |
|---|---|---|---|
| BR | 102018009865 | A2 | 12/2018 |
| BR | 112019021133 | A2 | 5/2020 |

(Continued)

OTHER PUBLICATIONS

Singh et al. "Nonvolatile Multibit Monolithically Integrated Programable Metasurface" U.S. Appl. No. 18/968,819, filed Dec. 4, 2024, 44 pages.

(Continued)

*Primary Examiner* — Dimary S Lopez Cruz
*Assistant Examiner* — Brandon Sean Woods
(74) *Attorney, Agent, or Firm* — Amin, Turocy & Watson, LLP

(57) ABSTRACT

The technology described herein is directed towards a reconfigurable intelligent surface design and implementation in which a small portion of the incoming signal energy of an impinging wave is coupled to a waveguide, with the majority of the signal reflected in a desired target direction. The sensed portion of the signal energy is used for evaluating the signal path in a current environment, including by assessing the phase and amplitude of the sampled signal at each unit cell, as well as their differential phase values between cells, e.g., selected consecutive cells. For example, differential phase values between cells can be used to accurately estimate the direction/location of the signal transmitter and/or the intended receiver(s). In one implementation, the captured energy is sensed in respective substrate integrated waveguides at the unit cell level, and output as respective signal readouts for determining different characteristics of the signal path.

20 Claims, 14 Drawing Sheets

(56) References Cited

U.S. PATENT DOCUMENTS

| | | | | |
|---|---|---|---|---|
| 7,239,219 | B2 | 7/2007 | Brown et al. | |
| 7,474,263 | B1 | 1/2009 | Garfinkle et al. | |
| 7,868,818 | B2 | 1/2011 | Henderson | |
| 8,063,822 | B2 | 11/2011 | Adams et al. | |
| 8,362,955 | B2 | 1/2013 | Adams et al. | |
| 8,467,363 | B2 | 6/2013 | Lea et al. | |
| 8,743,914 | B1 | 6/2014 | Jensen | |
| 8,824,442 | B2 | 9/2014 | Lea et al. | |
| 8,928,528 | B2 | 1/2015 | Harel et al. | |
| 9,001,809 | B2 | 4/2015 | Lea et al. | |
| 9,178,558 | B2 | 11/2015 | Lea et al. | |
| 9,203,147 | B2 | 12/2015 | Adams et al. | |
| 9,343,808 | B2 | 5/2016 | Harel et al. | |
| 9,350,411 | B2 | 5/2016 | Lea et al. | |
| 9,368,870 | B2 | 6/2016 | Dayanandan et al. | |
| 9,577,700 | B2 | 2/2017 | Lea et al. | |
| 9,595,765 | B1 * | 3/2017 | Valayil | H01Q 13/18 |
| 9,634,389 | B2 | 4/2017 | Tseng et al. | |
| 9,712,216 | B2 | 7/2017 | Lea et al. | |
| 10,135,501 | B2 | 11/2018 | Lea et al. | |
| 10,243,412 | B1 | 3/2019 | Fink et al. | |
| 10,566,693 | B2 | 2/2020 | Tsai et al. | |
| 10,720,969 | B2 | 7/2020 | Lea et al. | |
| 11,019,506 | B2 | 5/2021 | Wu et al. | |
| 11,057,019 | B2 | 7/2021 | El-Hinnawy et al. | |
| 11,114,759 | B1 | 9/2021 | Horn et al. | |
| 11,196,184 | B2 | 12/2021 | Jordan et al. | |
| 11,271,613 | B2 | 3/2022 | Lea et al. | |
| 11,595,827 | B2 | 2/2023 | Wu et al. | |
| 11,652,524 | B2 | 5/2023 | Jam et al. | |
| 11,699,862 | B2 | 7/2023 | Brown et al. | |
| 11,777,224 | B2 * | 10/2023 | Achour | H01Q 15/0026 343/909 |
| 11,777,225 | B2 * | 10/2023 | Chang | H01Q 15/0086 343/909 |
| 11,917,427 | B2 | 2/2024 | Wu et al. | |
| 11,923,619 | B2 | 3/2024 | Horn et al. | |
| 11,936,429 | B2 | 3/2024 | Ito et al. | |
| 12,027,779 | B1 | 7/2024 | Brown et al. | |
| 12,218,436 | B2 | 2/2025 | Ding et al. | |
| 12,237,882 | B1 | 2/2025 | Madanayake | |
| 12,266,867 | B2 | 4/2025 | Ding et al. | |
| 2008/0143601 | A1 | 6/2008 | Xu | |
| 2014/0349637 | A1 | 11/2014 | Hyde et al. | |
| 2015/0222014 | A1 * | 8/2015 | Stevenson | H01Q 13/18 342/372 |
| 2020/0071426 | A1 | 3/2020 | Matsumoto et al. | |
| 2020/0373678 | A1 * | 11/2020 | Park | H01P 3/121 |
| 2022/0190884 | A1 | 6/2022 | Lea et al. | |
| 2024/0079776 | A1 | 3/2024 | Scarborough et al. | |
| 2024/0097325 | A1 | 3/2024 | Hu et al. | |
| 2024/0396213 | A1 | 11/2024 | Ding et al. | |
| 2025/0239542 | A1 | 7/2025 | Yang et al. | |
| 2026/0081672 | A1 | 3/2026 | Kakhki et al. | |

FOREIGN PATENT DOCUMENTS

| | | | | |
|---|---|---|---|---|
| CA | 2 568 136 | C | 7/2008 | |
| CA | 2 591 915 | C | 6/2012 | |
| CA | 3 003 999 | C | 7/2019 | |
| CN | 1352490 | A | 6/2002 | |
| CN | 1352498 | A | 6/2002 | |
| CN | 1129237 | C | 11/2003 | |
| CN | 1160890 | C | 8/2004 | |
| CN | 1540903 | A | 10/2004 | |
| CN | 1554136 | A | 12/2004 | |
| CN | 1898885 | A | 1/2007 | |
| CN | 101091407 | A | 12/2007 | |
| CN | 101227216 | A | 7/2008 | |
| CN | 100435492 | C | 11/2008 | |
| CN | 100488091 | C | 5/2009 | |
| CN | 101091407 | B | 9/2011 | |
| CN | 203386900 | U | 1/2014 | |
| CN | 107070526 | A | 8/2017 | |
| CN | 107230837 | A | 10/2017 | |
| CN | 206922018 | U | 1/2018 | |
| CN | 107946774 | A | 4/2018 | |
| CN | 108155479 | A | 6/2018 | |
| CN | 108448221 | A | 8/2018 | |
| CN | 107946774 | B | 11/2018 | |
| CN | 109495189 | A | 3/2019 | |
| CN | 109509980 | A | 3/2019 | |
| CN | 111430907 | A | 7/2020 | |
| CN | 109495189 | B | 8/2020 | |
| CN | 107070526 | B | 11/2020 | |
| CN | 108448221 | B | 12/2020 | |
| CN | 112993597 | A | 6/2021 | |
| CN | 112993598 | A | 6/2021 | |
| CN | 108155479 | B | 8/2021 | |
| CN | 112993597 | B | 11/2022 | |
| CN | 112993598 | B | 11/2022 | |
| CN | 115332790 | A | 11/2022 | |
| CN | 116097525 | A | 5/2023 | |
| CN | 116325366 | A | 6/2023 | |
| CN | 109509980 | B | 11/2023 | |
| CN | 117121293 | A | 11/2023 | |
| CN | 107230837 | B | 12/2023 | |
| CN | 117546362 | A | 2/2024 | |
| CN | 117937095 | A | 4/2024 | |
| CN | 115332790 | B | 9/2024 | |
| CN | 116325366 | B | 1/2025 | |
| CN | 115548680 | B | 1/2026 | |
| EP | 0 718 911 | A1 | 6/1996 | |
| EP | 1 341 315 | A1 | 9/2003 | |
| EP | 1 341 315 | B1 | 3/2009 | |
| EP | 1 832 135 | B1 | 8/2012 | |
| EP | 2 925 040 | A1 | 9/2015 | |
| EP | 3 553 887 | A1 | 10/2019 | |
| EP | 4 340 123 | A1 | 3/2024 | |
| EP | 3 783 738 | B1 | 7/2025 | |
| GB | 2555380 | A | 5/2018 | |
| GB | 2556030 | A | 5/2018 | |
| GB | 2556031 | A | 5/2018 | |
| GB | 2556033 | A | 5/2018 | |
| GB | 2556034 | A | 5/2018 | |
| GB | 2556340 | A | 5/2018 | |
| GB | 2622926 | A * | 4/2024 | H01Q 3/38 |
| JP | H6-326510 | A | 11/1994 | |
| JP | H9-284035 | A | 10/1997 | |
| JP | H11-251821 | A | 9/1999 | |
| KR | 10-2007-0112111 | A | 11/2007 | |
| KR | 10-2020-0071426 | A | 6/2020 | |
| KR | 10-2251287 | B1 | 5/2021 | |
| KR | 10-2022-0032015 | A | 3/2022 | |
| KR | 10-2023-0040987 | A | 3/2023 | |
| KR | 10-2023-0048025 | A | 4/2023 | |
| TW | 443004 | B | 6/2001 | |
| TW | 474072 | B | 1/2002 | |
| TW | 202207647 | A | 2/2022 | |
| TW | 202418771 | A | 5/2024 | |
| TW | 1904165 | B | 11/2025 | |
| WO | 01/17065 | A1 | 3/2001 | |
| WO | 02/43256 | A1 | 5/2002 | |
| WO | 03/007420 | A1 | 1/2003 | |
| WO | 2006/071154 | A1 | 7/2006 | |
| WO | 2014/114252 | A1 | 7/2014 | |
| WO | 2015/142723 | A1 | 9/2015 | |
| WO | 2018/060660 | A1 | 4/2018 | |
| WO | 2018/060662 | A1 | 4/2018 | |
| WO | 2018/060664 | A1 | 4/2018 | |
| WO | 2018/103677 | A1 | 6/2018 | |
| WO | 2018/173761 | A1 | 9/2018 | |
| WO | 2019/034118 | A1 | 2/2019 | |
| WO | 2019/047831 | A1 | 3/2019 | |
| WO | 2021/106041 | A1 | 6/2021 | |
| WO | 2021/252929 | A1 | 12/2021 | |
| WO | 2022/035490 | A1 | 2/2022 | |
| WO | 2022/040552 | A2 | 2/2022 | |
| WO | 2022/132392 | A1 | 6/2022 | |
| WO | 2023/274200 | A1 | 1/2023 | |
| WO | 2023/019485 | A1 | 2/2023 | |
| WO | 2023/242921 | A1 | 12/2023 | |
| WO | 2024/037229 | A1 | 2/2024 | |

(56) References Cited

FOREIGN PATENT DOCUMENTS

| | | | |
|---|---|---|---|
| WO | 2024/064503 | A1 | 3/2024 |
| WO | 2024/118325 | A1 | 6/2024 |
| WO | 2024/229606 | A1 | 11/2024 |
| WO | 2025/136376 | A1 | 6/2025 |

OTHER PUBLICATIONS

Singh et al. "Multiport Broadband Monolithic Phase-Change Radio Frequency Switch" U.S. Appl. No. 18/968,887, filed Dec. 4, 2024, 43 pages.

Singh et al. "Monolithic Butler Matrix for Beamforming Applications Utilizing Nonvolatile Radio Frequency Switches and Planar Wideband Couplers" U.S. Appl. No. 18/968,905, filed Dec. 4, 2024, 58 pages.

Wang et al., "A Low-Loss Butler Matrix Using Patch Element and Honeycomb Concept on SISL Platform", In IEEE Transactions on Microwave Theory and Techniques, vol. 66, No. 8, Aug. 2018, pp. 3622-3631.

Messem et al., "A 4 x 4 Millimeterwave-Frequency Butler Matrix in Grounded Co-Planar Waveguide Technology for Compact Integration With 5G Antenna Arrays", In IEEE Transactions on Microwave Theory and Techniques, vol. 71, No. 1, Jan. 2023, pp. 122-134.

Ren et al., "A Novel Design of 4x4 Butler Matrix With Relatively Flexible Phase Differences", In IEEE Antennas and Wireless Propagation Letters, vol. 15, 2016, pp. 1277-1280.

Kakhki et al., "Comparison of Butler Matrix and Rotman Lens Beam-Switching Networks at K-Band", 2024 IEEE International Symposium on Antennas and Propagation and INC/USNC-URSI Radio ScienceMeeting (AP-S/Inc-USNC-URSI), 2024, pp. 141-142.

Non-Final office action received for U.S. Appl. No. 18/968,905 dated Apr. 23, 2026, 15 pages.

Notice of Allowance received for U.S. Appl. No. 18/968,905 dated Jun. 5, 2026, 26 pages.

* cited by examiner

RECONFIGURABLE METASURFACE WITH INTEGRATED SIGNAL READOUT MECHANISM

RELATED APPLICATION

The subject patent application is related to U.S. patent application Ser. No. 18/968,819, filed Dec. 4, 2024, and entitled "NONVOLATILE MULTIBIT MONOLITHICALLY INTEGRATED PROGRAMABLE METASURFACE", the entirety of which patent application is hereby incorporated by reference herein.

BACKGROUND

Reconfigurable intelligent surfaces (alternatively referred to as intelligent reflective surfaces, or metasurfaces) are manmade thin reflective or refractive surfaces whose electromagnetic response can be electronically controlled. Reconfigurable intelligent surfaces are characterized by their two-dimensional arrays of electronically controllable reflecting elements that can dynamically manipulate electromagnetic waves by altering attributes such as phase, amplitude, and direction of the incoming signal. Because of their ability to alter the attributes of signals reflected at the surface, intelligent reflective surfaces are being evaluated for use in beyond fifth generation (B5G) and sixth generation (6G) wireless communication and wireless sensing networks.

In communications assisted by a reconfigurable intelligent surface, the real-time conditions of the channel/signal environment at the array of elements often can change. Knowing such the real-time conditions of the channel/signal environment allows adapting the reconfigurable intelligent surface based on this information. However, prior approaches to obtain such information have significant drawbacks, including the need to add dedicated receiving antennas and a huge number of radio frequency chains, while also reducing the overall effective surface of the reconfigurable intelligent surface, and/or not being extendable to non-line-of-sight communications or low ambient light scenarios.

BRIEF DESCRIPTION OF THE DRAWINGS

The technology described herein is illustrated by way of example and not limited to the accompanying figures in which like reference numerals indicate similar elements and in which.

DETAILED DESCRIPTION

Figure 1:
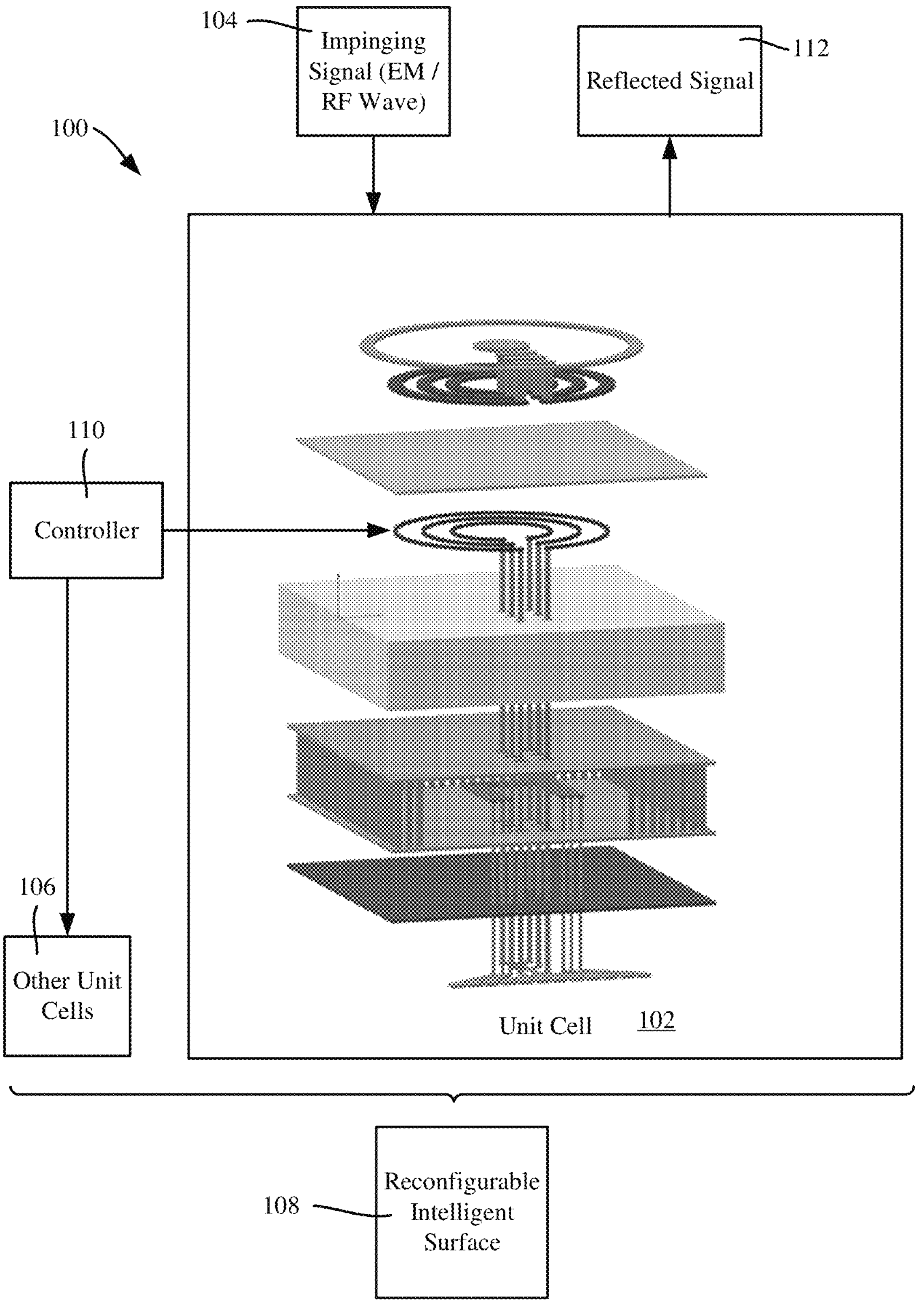
FIG. 1 is an example conceptual block diagram showing an example system that includes a unit cell of a reconfigurable intelligent surface for reflecting an incoming electromagnetic signal while sensing a portion of the incoming signal energy, in accordance with various example embodiments and implementations of the subject disclosure.

The technology described herein is generally directed towards a reconfigurable intelligent surface (metasurface) with an integrated capability to acquire information about the signal path of an incoming electromagnetic wave, such as the signal strength data of the incoming electromagnetic signal, or angle of arrival data of the incoming electromagnetic signal, that is, the direction/location of the transmitter and the intended receivers. This can be based on the phase differential data between at least two (e.g., adjacent) unit cells of the reconfigurable intelligent surface, or differential delay data between the at least two (e.g., adjacent) unit cells.

To this end, unit cells of the reconfigurable intelligent surface acquire the channel information by sensing a small portion of the incoming signal as coupling strength data, and using the extracted coupling strength data to get valuable signal information, without sacrificing most of the signal power to be reflected towards the intended targets. In practical usage scenarios, the capability of obtaining the signal information allows for the accurate steering of wireless signals to desired areas, such as for enhancing the coverage in shadowed or traditionally weak signal zones. Such a reconfigurable intelligent surface beamforms a reflected signal in a passive way by varying the unit cells'phases to redirect incoming energy towards specific users or regions, without the need for active components, unlike traditional beamforming that requires phased array antennas, which can be complex and power consuming.

In one implementation, at the unit cell level in a reconfigurable intelligent surface, a small portion of the incident wave is coupled to a substrate integrated waveguide. A wide variety of significant channel information can be acquired by studying the phase coupling strength data of this sampled incident signal at each unit cell, as well as their differential values between cells, e.g., consecutive cells. Substrate integrated waveguides offer the benefit of easy integration into conventional semiconductor and printed circuit board fabrication techniques. In this way, a small amount of an incoming signal is coupled to the substrate integrated waveguide, which can be output to study different characteristics of the signal. Note that the amount of coupled energy into the substrate integrated waveguide, and at the signal readout, can be adjusted during design of a reconfigurable intelligent surface.

One highly desirable result is a reconfigurable intelligent surface with integrated sensing capability that can detect the signal strength and/or direction of an incoming electromagnetic signals, and based on that information, more intelligently redirect the incoming signals in the direction of intended targets, based on acquiring knowledge of from where the signals originated relative to the receiver. The technology described herein accomplishes this by capturing and evaluating a small portion of the incoming signal's energy, while also reflecting most of the power to reflect the incoming signals in various ways as appropriate.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation.

Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some practical limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual depiction of an example system 100 including a unit cell 102 that redirects (e.g., reflects) an impinging (incoming) signal 104, while also sensing a portion of the incoming signal energy as sensed coupling strength data, and providing a signal readout representative of the sensed coupling strength data. The unit cell 102, in conjunction with other unit cells 106, form a reconfigurable intelligent surface 108.

The reconfigurable intelligent surface 108 is coupled to or otherwise incorporates a controller 110 that controls the phase shifts of the unit cell 102 and the other unit cells 106. This allows the incoming electromagnetic wave/signal 104 to be reflected as a beam 112 that can be shaped and steered in a desired direction. However, to do so intelligently, having real time or near real-time information of the channel (e.g., incoming signal angle of arrival and magnitude of the incoming electromagnetic wave) is highly beneficial. Described herein is a reconfigurable intelligent surface framework that can infer the direction of the incident beams and thus steer them, e.g., in the reflection half space. To this end, the unit cells of the reconfigurable intelligent surface 108 have the ability to extract a fragment of the incident wave for channel study, while reflecting most of the incident wave, thereby ensuring sufficient reflective power and a modifiable reflective phase for the formation of optimal reflection configurations.

Described herein is one example unit cell element with nonvolatile phase change material-based beamforming capability and three-bit coupling strength tuning for EM signal readout, which can be monolithically integrated; examples of such unit cells are depicted in FIGS. 1-2C, 5 and 6. More particularly, FIG. 2A is a three-dimensional (3D) view of the unit cell 102 of FIG. 1. FIG. 2B is a two-dimensional (2D) view top view showing various components of the unit cell as viewed from above, including an inner metallic patch 222, and outer metallic ring 224 and inner penannular rings 226(1)-226(2). Note that while three such inner penannular rings 226(1)-226(2) are depicted, which are controllably switched between conductive and nonconductive states as described herein to change the phase response of the unit cell 102, this is a nonlimiting example, and any practical number of such phase change components can be present in a given unit cell. Note that the number of state-changeable inner penannular rings, N, can change the phase in $2^N$ ways, that is, one inner ring allows for two combinations corresponding to two different phases, two inner rings allow for four combinations corresponding to four different phases, three inner rings allow for eight combinations corresponding to eight different phases, and so on.

Figure 2A:
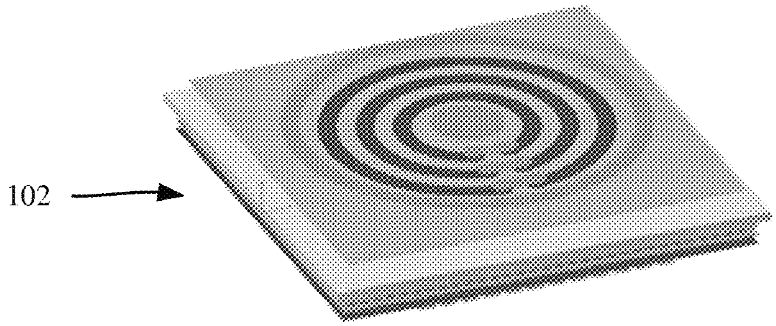
FIG. 2A is a three-dimensional (3D) view representation of an example unit cell, in accordance with various example embodiments and implementations of the subject disclosure.
Figure 2B:
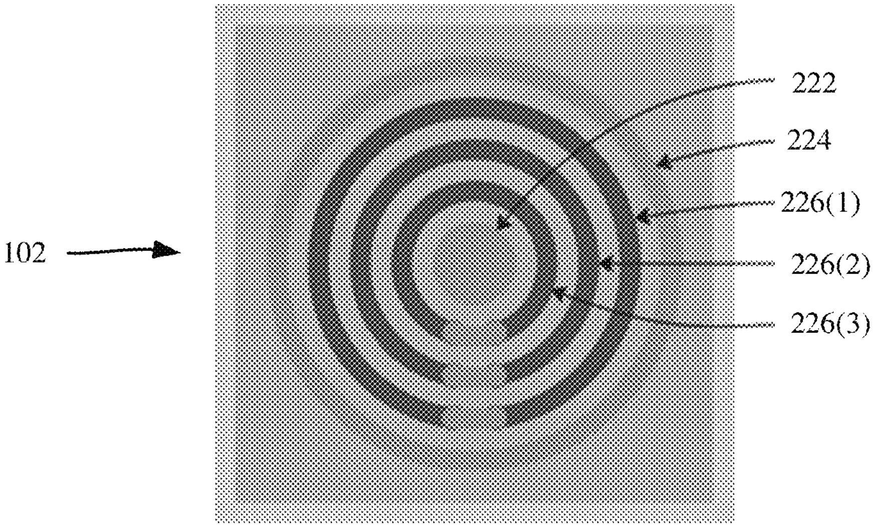
FIGS. 2B and 2C show a two-dimensional (2D) top view and a 2D bottom view, respectively, of an example unit cell, in accordance with various example embodiments and implementations of the subject disclosure.
Figure 2C:
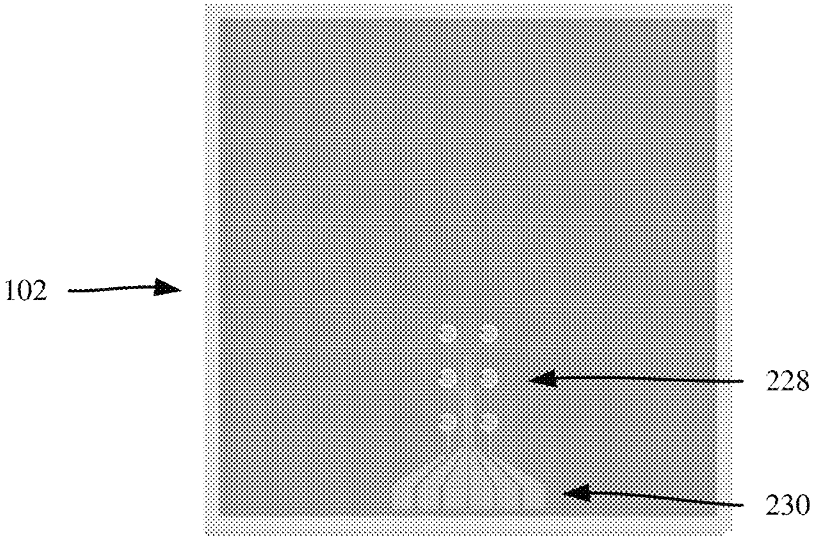

FIG. 2B is a 2D bottom view showing various components of the unit cell as viewed from below, including interconnects to a heater network of refractory heaters (collectively labeled) 228. Some of the contact pads (collectively labeled) 230 per unit cell (e.g., 102) facilitate coupling of the heaters to control voltage (or current) pulses. These contact pads 230, along with signal readout contact pads, are shown in more detail in FIG. 7.

Figure 3:
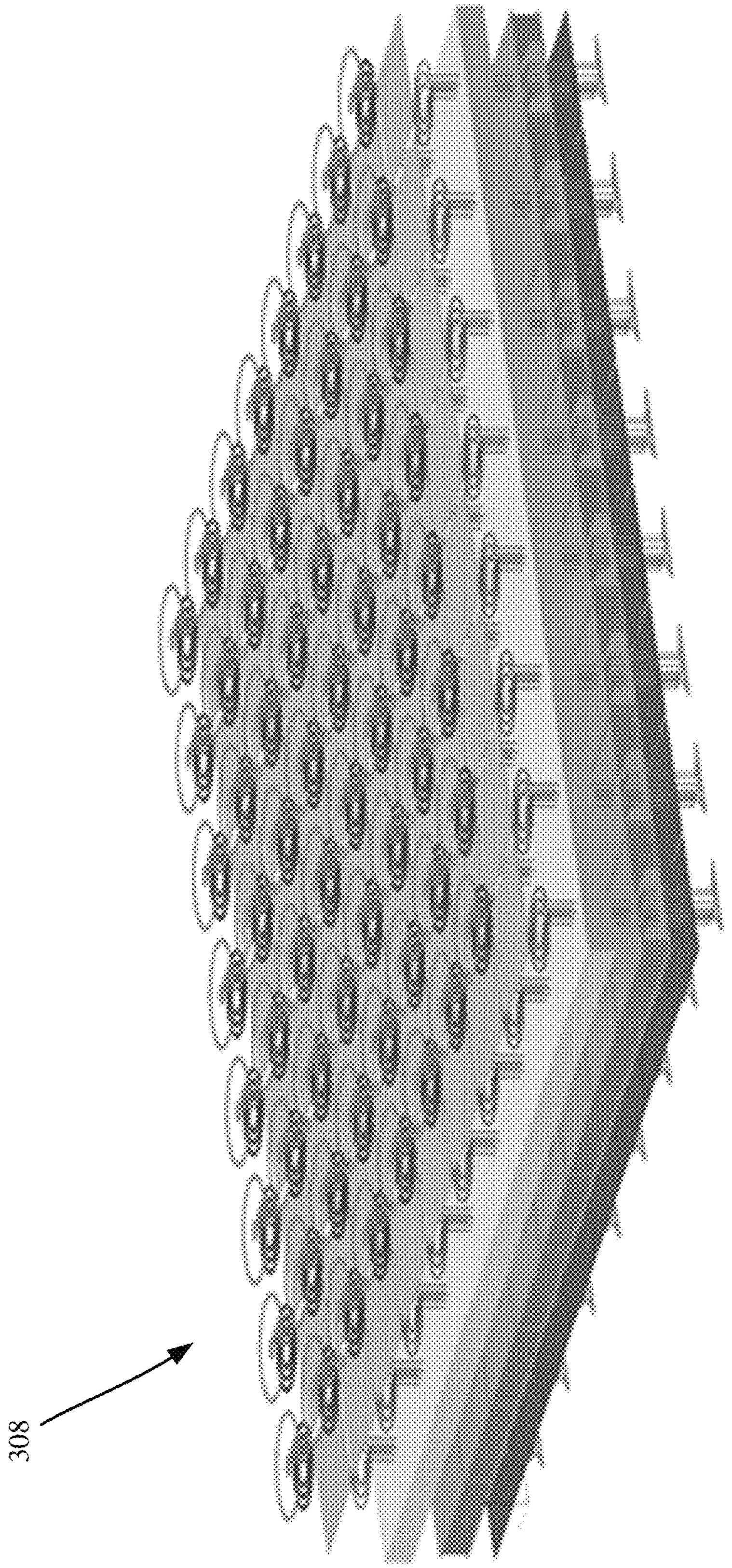
FIG. 3 is a 3D view representation of an example metasurface of unit cells, in accordance with various example embodiments and implementations of the subject disclosure.
Figure 4A:
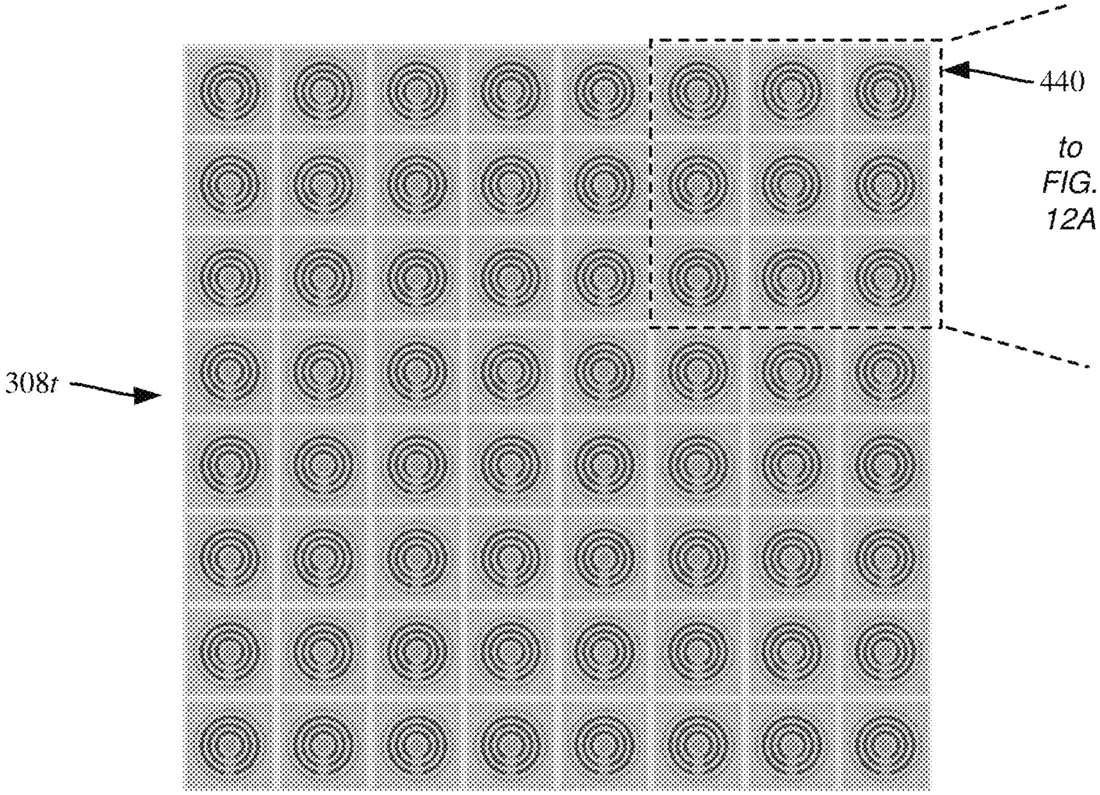
FIGS. 4A and 4B show a 2D top view and a 2D bottom view, respectively, of an example metasurface of unit cells, in accordance with various example embodiments and implementations of the subject disclosure.
Figure 4B:
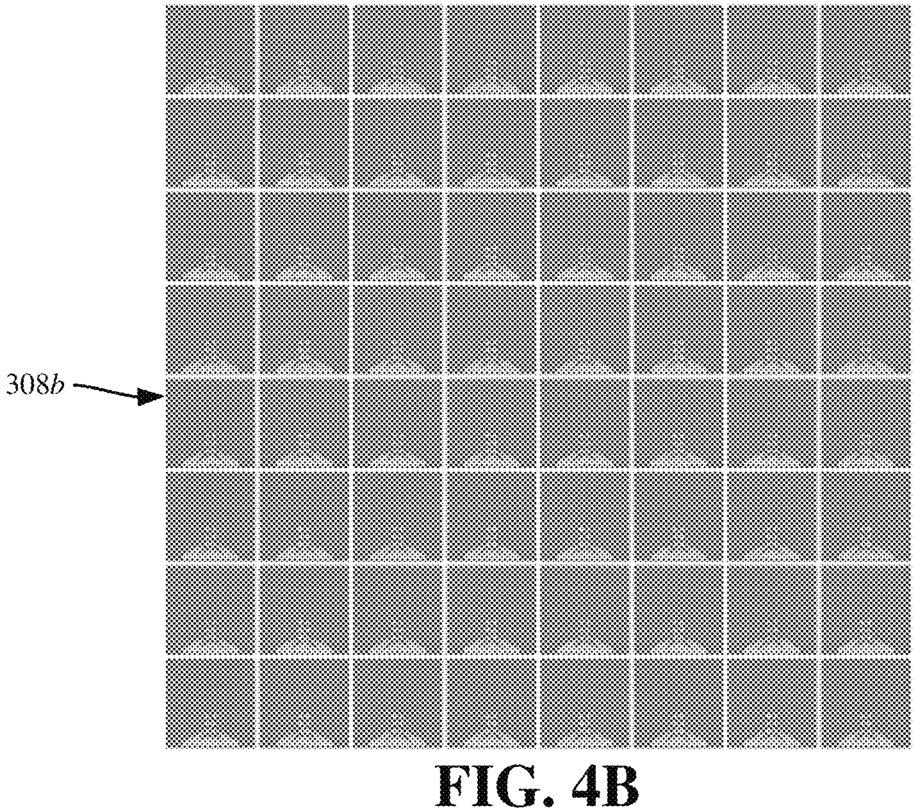

When assembled (fabricated), an array of such unit cells provides a metasurface 308, (corresponding to the metasurface 108 of FIG. 1), as shown in FIGS. 3, 4A and 4B. FIG. 3 shows a 3D view of the metasurface 308, while FIGS. 4A and 4B show top and bottom 2D views (of the metasurface 308) as 308*t* and 308*b*, respectively. Note that FIG. 3 and FIG. 4B include the contact pads for signal readouts. A subarray 440 of unit cells is also identified, as described with reference to FIG. 12A.

Figure 5:
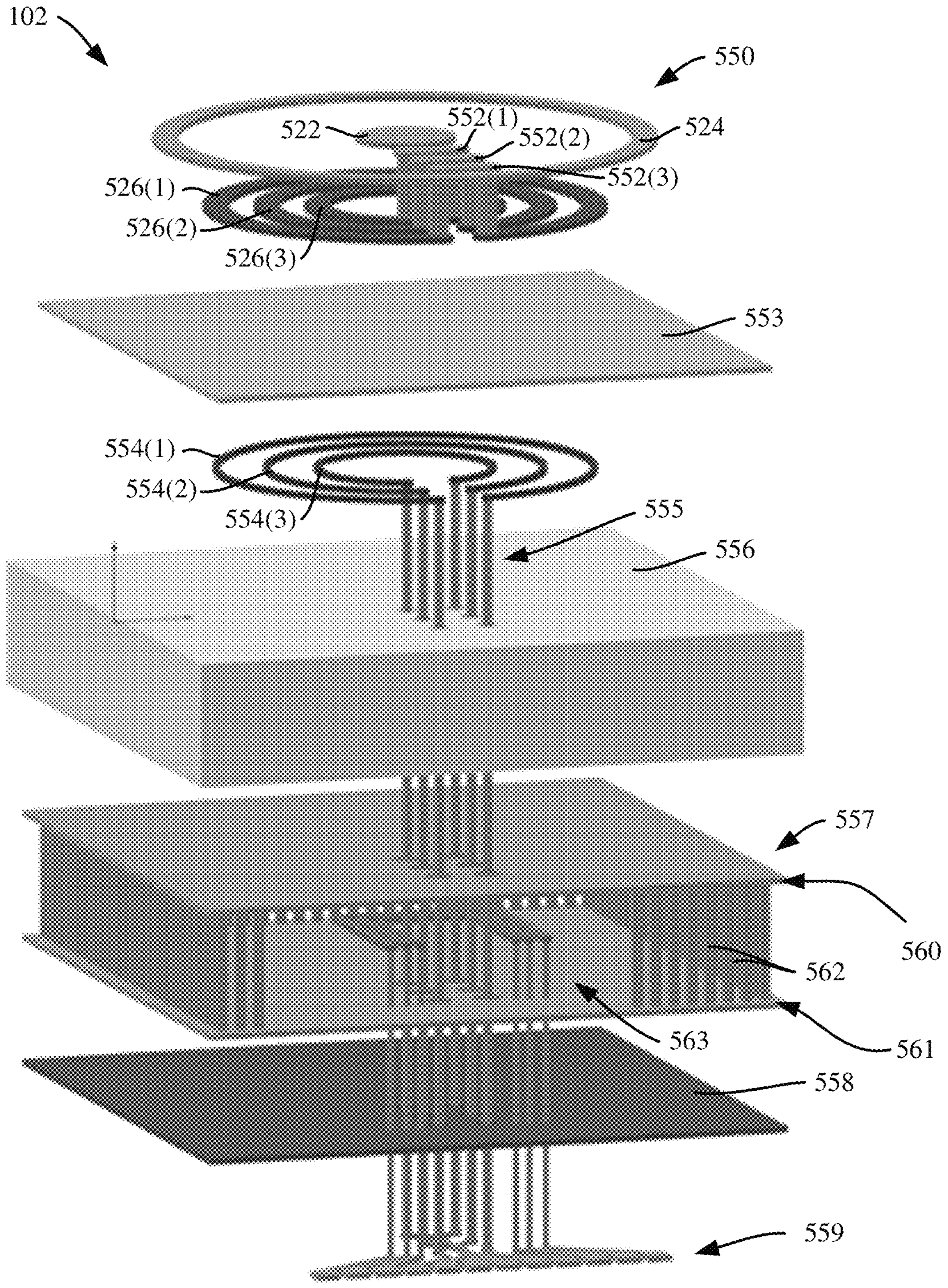
FIG. 5 is a three-dimensional exploded representation of an example unit cell that includes a substrate integrated waveguide, in which some side vias of the substrate integrated waveguide are not visible so as to illustrate an internal part of the substrate integrated waveguide, in accordance with various example embodiments and implementations of the subject disclosure.

In one implementation generally shown in FIG. 5, the unit cell 102 includes a resonating pattern 550 of metallic elements, such as including a ring-shaped resonator configured to resonate when the incoming electromagnetic (EM)/radio frequency (RF) wave is impinging on the unit cell 102, such as an RF signal near or within the millimeter wavelength, e.g., (above 25 gigahertz). In general, the metallic resonating pattern includes an inner metal patch 522, which in this example is disk-shaped, and an outer ring 524, which in this example is circular. Chalcogenide penannular rings 526(1)-526(3), coupled on their respective opposite ends to metal patches 552(1)-552(3), respectively, can have their states controllably changed as described herein, which thereby various the phase response of the unit cell 502.

To control the unit cell's phase, heaters 554(1)-554(3) beneath an upper dielectric layer 553 that allows heat to transferred through (e.g., SiNx (Silicon Nitride) or Aluminum nitride (AlN)) can be individually pulsed with voltage pulses that individually change the states of the chalcogenide penannular rings 526(1)-526(3) depending on the pulse voltage and time applied. Interconnects 555 through the various lower components described herein, including a substrate 556, a substrate integrated waveguide 557, and a lower dielectric layer 558, allow the voltage pulses to be applied to the heaters 554(1)-554(3) via corresponding pairs of the contact pads 559.

In general, the substrate integrated waveguide 557 has a top metallic plate 560 and a bottom metallic plate 561, with side vias 562 around the periphery of the substrate integrated waveguide 557. In this implementation, the top metallic plate 560 serves as the radio frequency (RF) ground plane of the resonator. Note that some of the side vias 562 in the front are omitted in the drawings herein so as to facilitate viewing of the sensor device 563.

Figure 6:
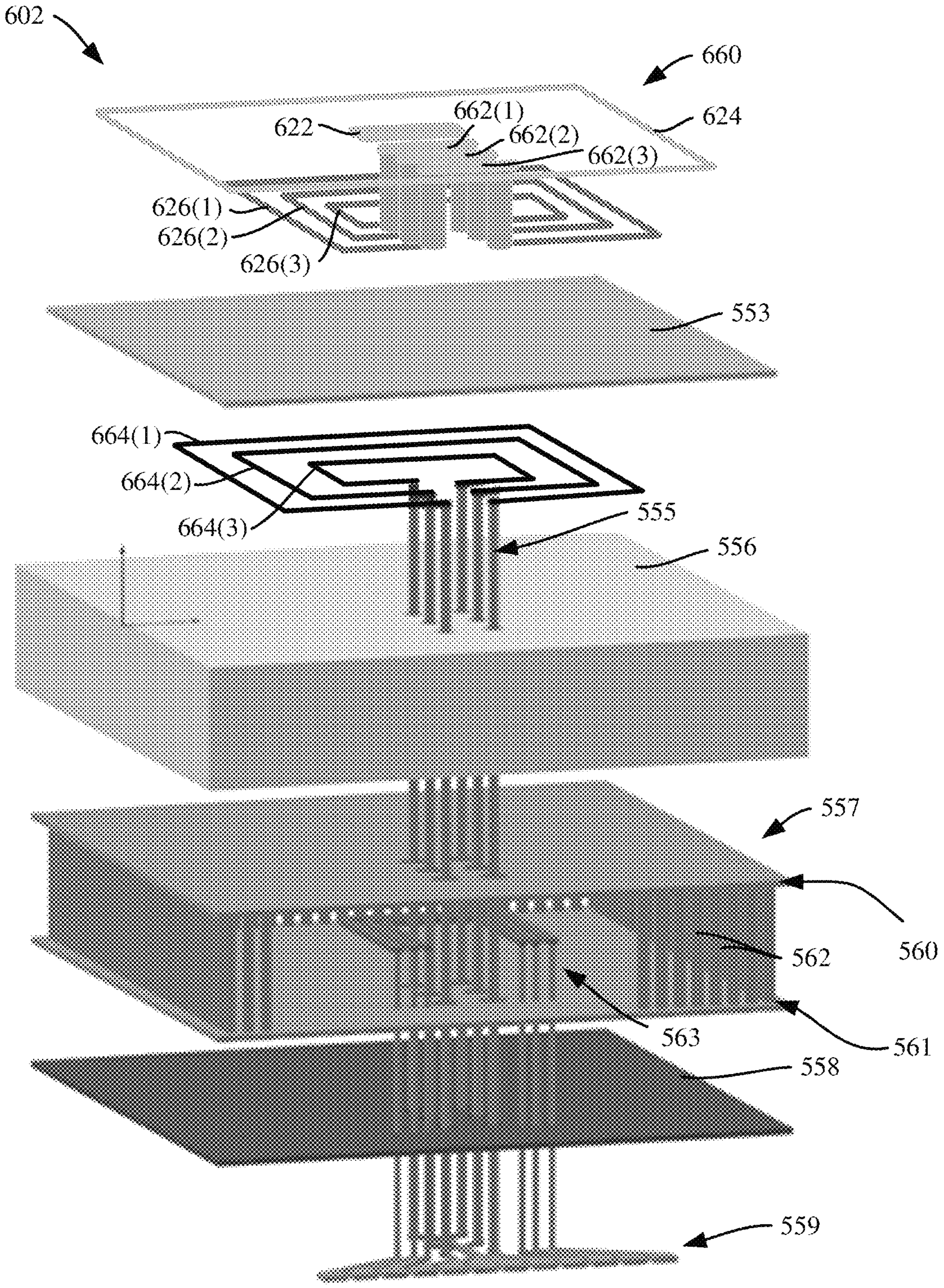
FIG. 6 is a 3D exploded view representation of an alternative example unit cell that includes a substrate integrated waveguide, in which some side vias of the substrate integrated waveguide are not visible so as to illustrate an internal part of the substrate integrated waveguide, in accordance with various example embodiments and implementations of the subject disclosure.

FIG. 6 shows a unit cell 602 similar to the unit cell 102 depicted in FIG. 5, in which similar elements are labeled 6xx instead of 5xx, while identical elements retain the same 5xx label. In general, the metallic resonating pattern 624 is rectangular shaped, as are the chalcogenide penannular rings 626(1)-626(3) and the heaters 664(1)-664(3). While any shape metallic patterns and chalcogenide elements can be used, as long as the resonator resonates at the designed resonance frequency, unlike circular elements, rectangular elements can be oriented differently, which can affect polarization.

Figure 7:
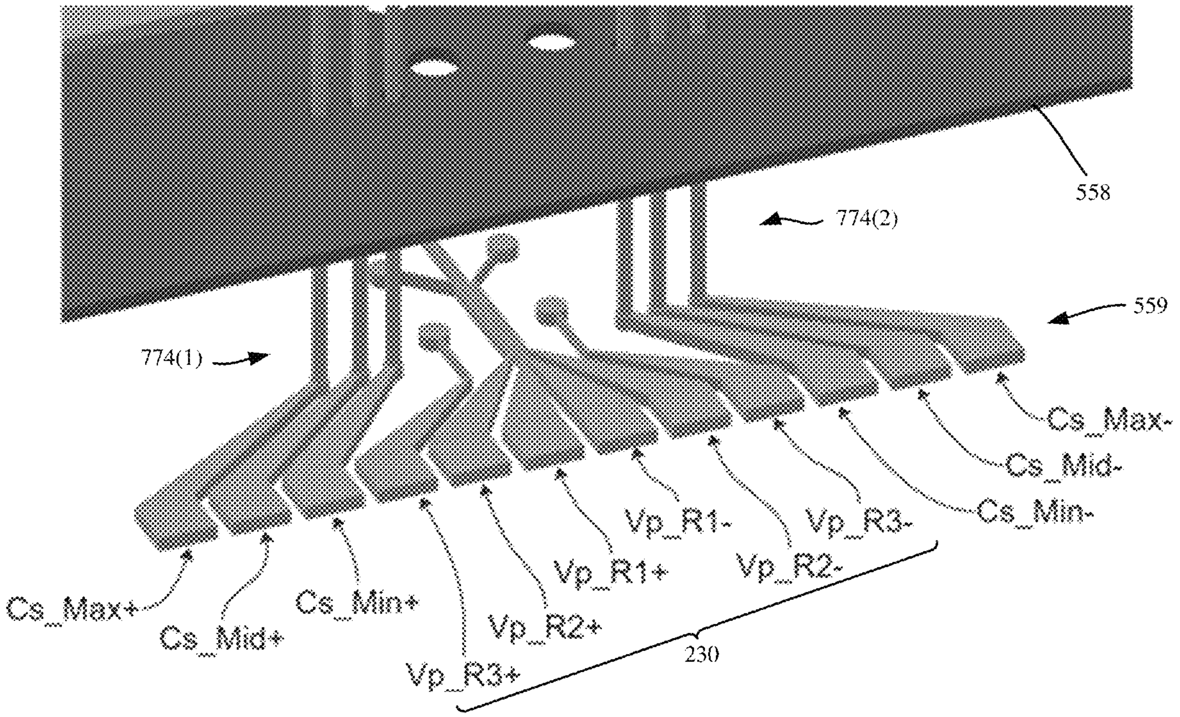
FIG. 7 is an enlarged 3D view representation of contacts of a portion of an example unit cell, in accordance with various example embodiments and implementations of the subject disclosure.

FIG. 7 is a zoomed in view of the contacts 559 beneath the lower dielectric layer 558. As described with reference to FIG. 2, some of the contact pads are used for applying voltage pulses to the heaters, (e.g., pairs Vp_R3+ and VpR3−, Vp_R2+ and VpR2−, and Vp_R1+ and VpR1; note that in an alternative implementation, the minus contacts can be shared, e.g., DC ground). Also note that in the example implementation depicted, the interconnects 774(1) and 774 (2) to the sensing device 563 connect the contact pads labeled Cs_MAX+ and CsMAX−, Cs_MID+ and CsMID−, and Cs_MIN+ and CsMIN to the sensing device 563 for the signal readouts of the coupling strength (Cs).

Figure 8:
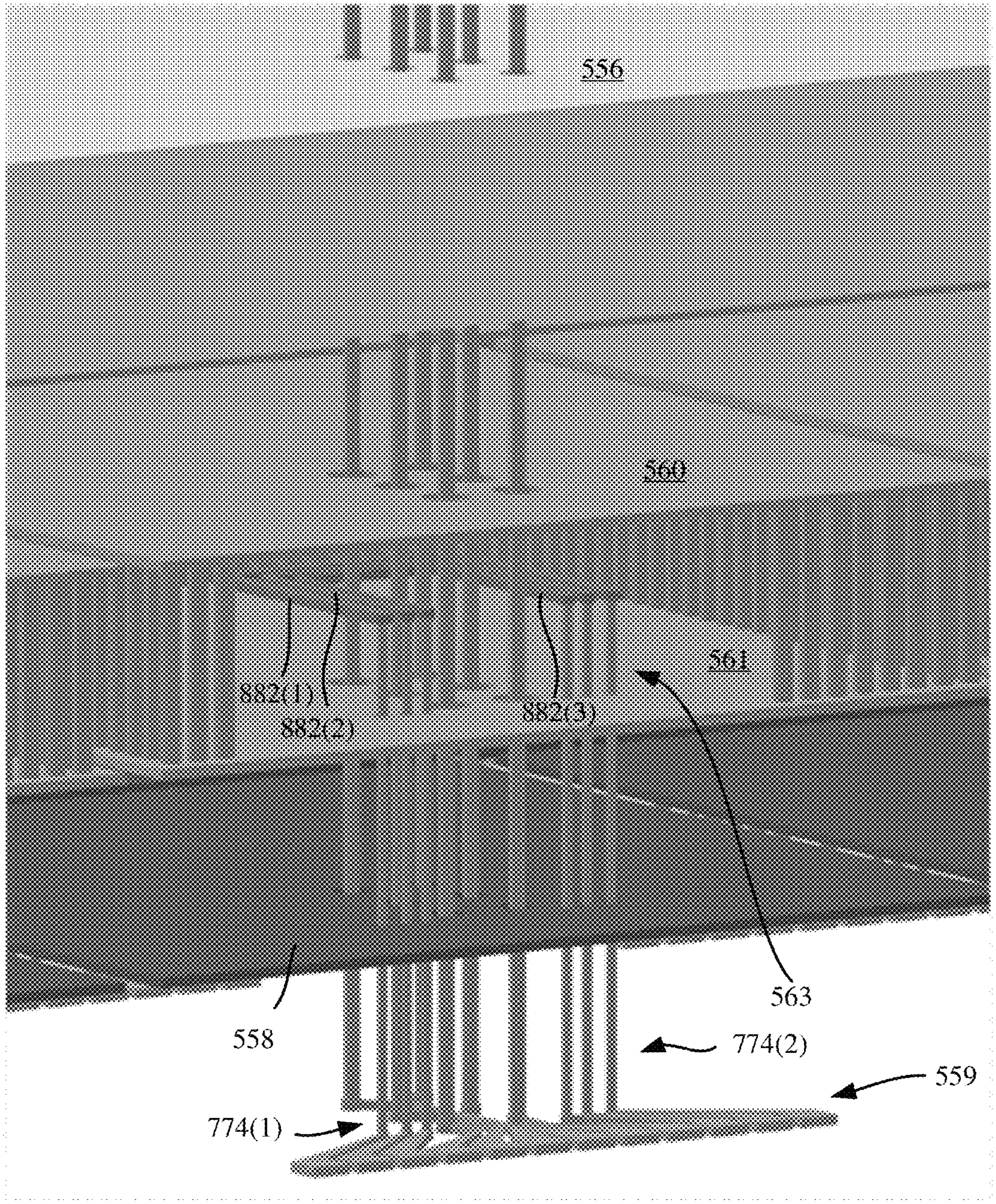
FIG. 8 is an enlarged 3D view representation of a portion of an example unit cell that includes a substrate integrated waveguide, in which some side vias of the substrate integrated waveguide are not visible so as to illustrate an internal part of the substrate integrated waveguide, in accordance with various example embodiments and implementations of the subject disclosure.
Figure 9A:
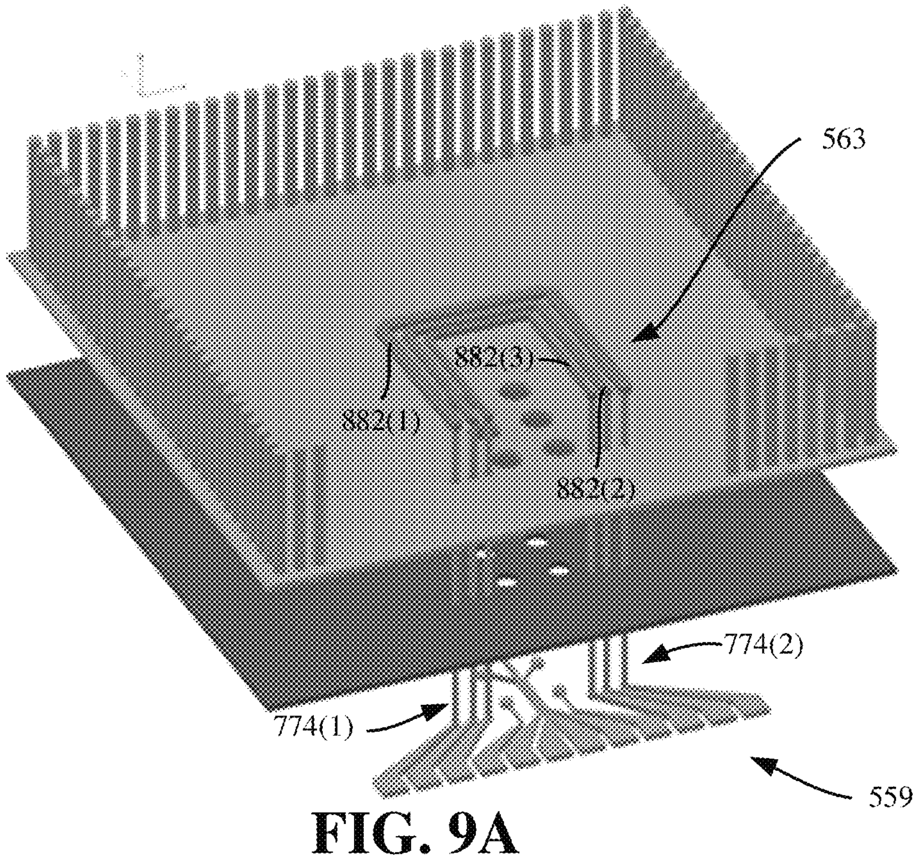
FIG. 9A is an enlarged 3D view representation of a portion of an example unit cell that shows a sensing device within a substrate integrated waveguide, in which the top and some side vias of the substrate integrated waveguide are not visible so as to illustrate an internal part of the substrate integrated waveguide, in accordance with various example embodiments and implementations of the subject disclosure.
Figure 9B:
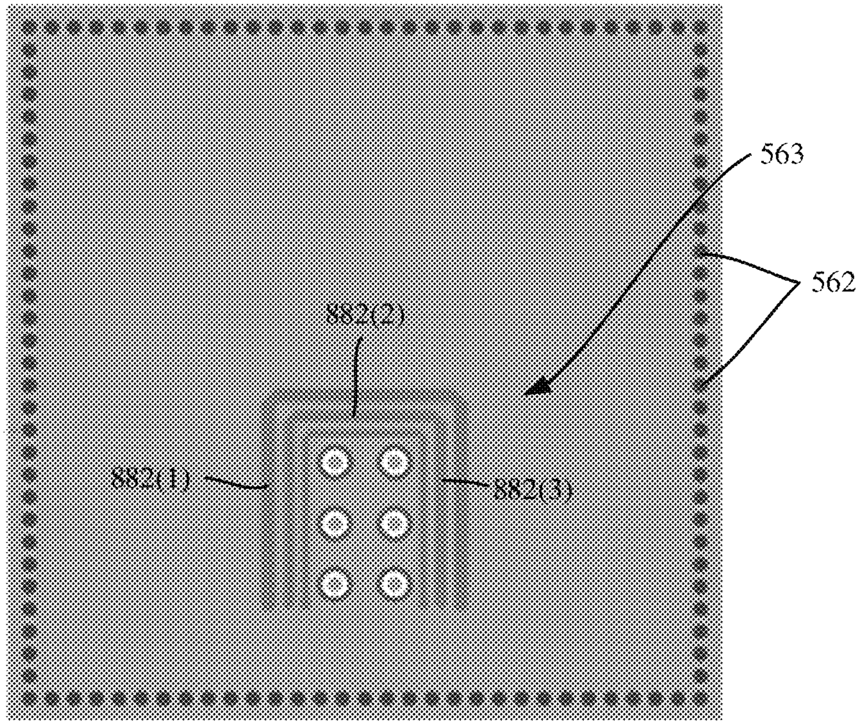
FIG. 9B is a 2D view representation of a sensing device for inclusion within a substrate integrated waveguide for sensing coupling strength portion of an example unit cell, in accordance with various example embodiments and implementations of the subject disclosure.

More particularly, to detect the coupling strength, a sensor device 563 is located in the substrate integrated waveguide 557 (FIG. 5), as shown in larger detail in FIGS. 8, 9A and 9B. in general, to obtain the information (coupling strength) from the portion of the signal energy captured by the substrate integrated waveguide 557 (FIG. 5), the RF-coupled sensor device 563 extends into the substrate integrated waveguide 557. This picks up at least some of the portion of the EM energy, and provides the picked up energy as electrical output to the electrical sensing contacts (Cs_Max+ and CsMax−, Cs_Mid+ and CsMid−, and Cs_Min+ and CsMin) through the interconnects 774(1) and 774(2).

In the example implementation depicted, the sensor device 563 includes three U-shaped (annular ring) sensing elements 882(1)-882(3) coupled at each end to their respective contacts. In general, the outermost and widest sensing element 882(1) corresponds to the Cs_Max signal readout, the central and medium width sensing element 882(2) corresponds to the Cs_Mid signal readout and the innermost and narrowest sensing element 882(3) corresponds to the Cs_Min signal readout. This is a nonlimiting example, as alternative implementations can have a single sensor element, two sensor elements, four sensor elements and more. Notwithstanding the number of sensing elements, positioning the sensing element(s) to surround much of the periphery around the interconnects helps capture as much of the he energy as possible. Further, having multiple sensing elements, such as one each for minimum, medium and maximum capture allow for choosing any one or any combination thereof to facilitate detection of a sufficient coupling strength/differential phase disparity among the unit cells, e.g., a row of unit cells of the metasurface, as larger, clear disparity data helps in determining the signal path information. Note that sensed coupling strength that is too small can lead to errors, while sensed coupling strength that is too large can overpower the ability to detect any disparities among the unit cells.

Indeed, a computing device that processes the signal readouts, which can be the controller 110 of FIG. 1 or a different computing device, can select or combine the readouts from among the sensors to determine a set of readouts one with a sufficient amount of coupling strength and phase disparity between unit cells. Further, if one row (or column) of unit cells does not have adequate sensed data among the possible permutations (e.g., of high, medium and low readouts), the computing device can select a different row (or column). Still further, the computing device can review multiple rows, such as to validate the signal path results using at least two rows before reconfiguring the metasurface.

Figure 10A:
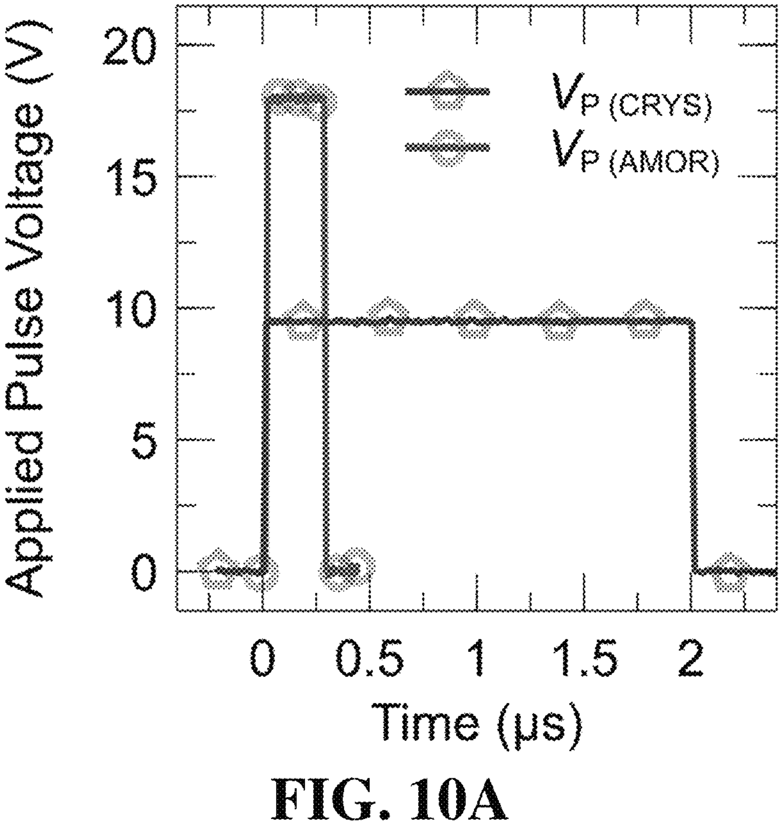
FIGS. 10A, 10B, 11A and 11B show how a heater can change the states of a phase change material with applied voltage or current pulses, in accordance with various example embodiments and implementations of the subject disclosure.
Figure 10B:
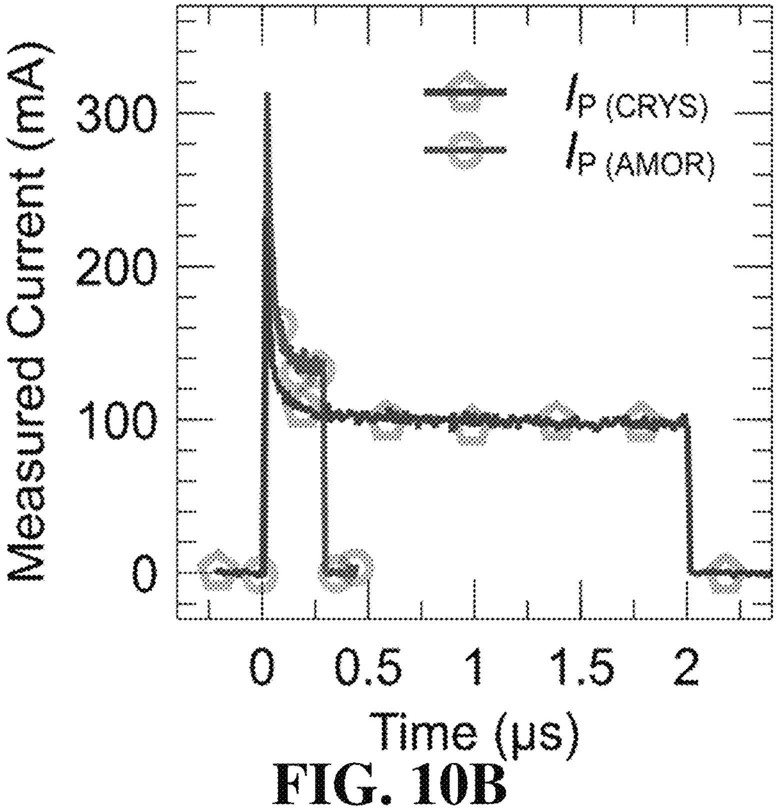
Figure 11A:
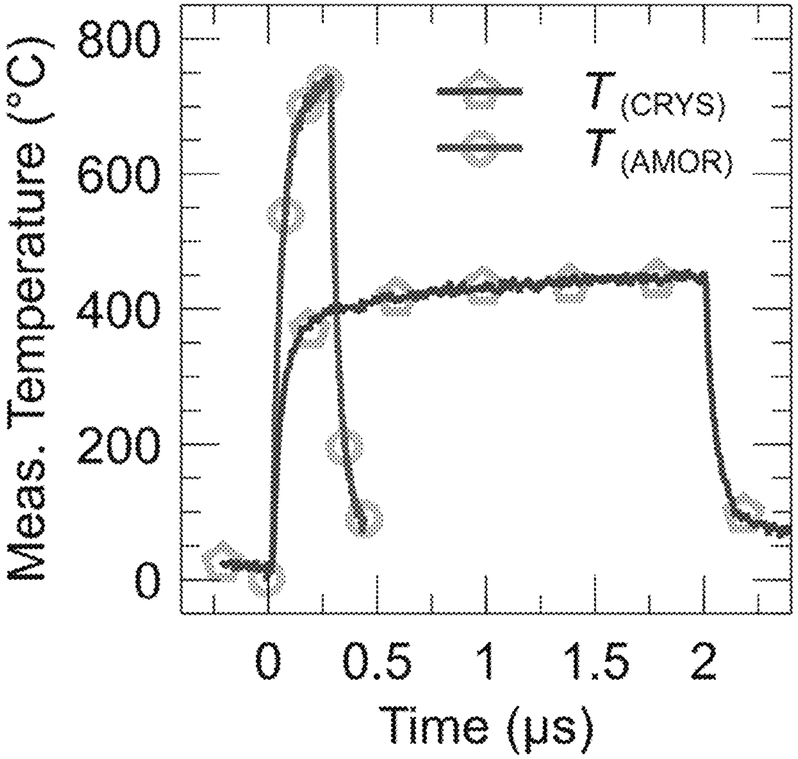
Figure 11B:
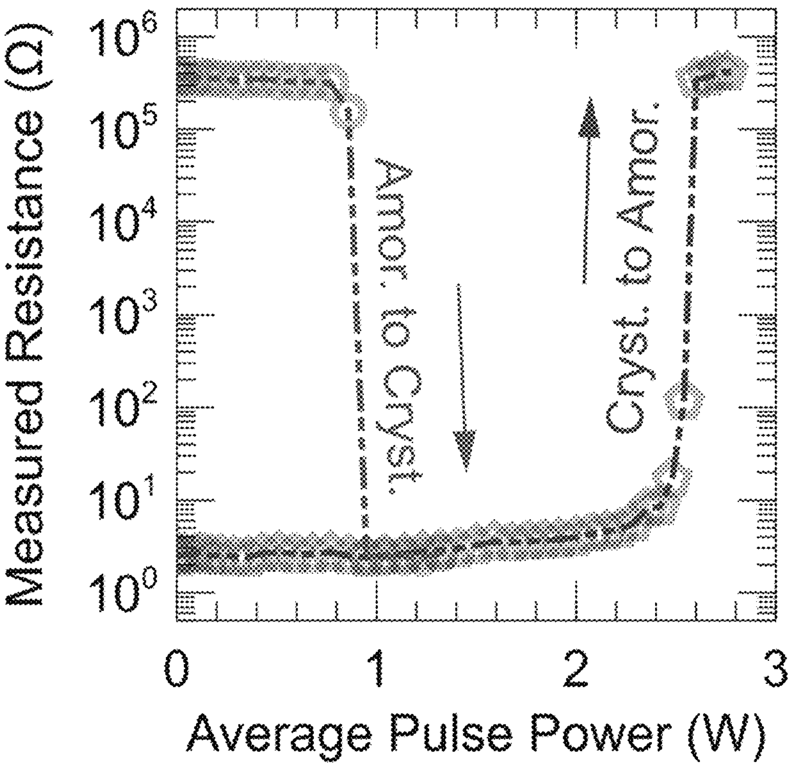

Turning to heating phase change (chalcogenide) material to change its state from conductive (crystalline) state to nonconductive (amorphous) state and vice-versa, FIGS. 10A-11B show graphical representations of the pulse types for switch actuation. As can be seen in FIG. 10A which shows the distinct types of applied voltage pulses, a shorter duration (about 0.5 microseconds, or μS), higher voltage (around 18 Volts, or V) pulse $Vp_{(AMOR)}$ changes the chalcogenide material to its nonconductive, amorphous state, whereas a longer duration (about 2.0 μS, lower voltage (around 10 V) pulse $Vp_{(CRYS)}$ changes the chalcogenide material to its conductive, crystalline state. FIG. 10B shows the corresponding measured current levels in milliamps (mA), and FIG. 11A shows the corresponding measured temperature (measured temperature generated in refractory micro-heaters) in degrees Centigrade (° C.). FIG. 11B shows the changes in measured device resistance in Ohms (Ω) based on varied average pulse power in Watts (W).

To illustrate how the proposed design can deduce information about the signal path, a row of 16 elements was simulated. As shown in FIG. 12B, the simulation shows differential phase along a metasurface array of 16×1 unit cell elements for an incoming wave for varied coupling strength of probe. For instance, the measurement corresponding to ‘2’ indicates the phase disparity between the fields sampled by the sensors in the second and third substrate integrated waveguides. Other factors, such as the strength of the incoming wave can be studied from the magnitude of $S_{21}$.

Figure 12A:
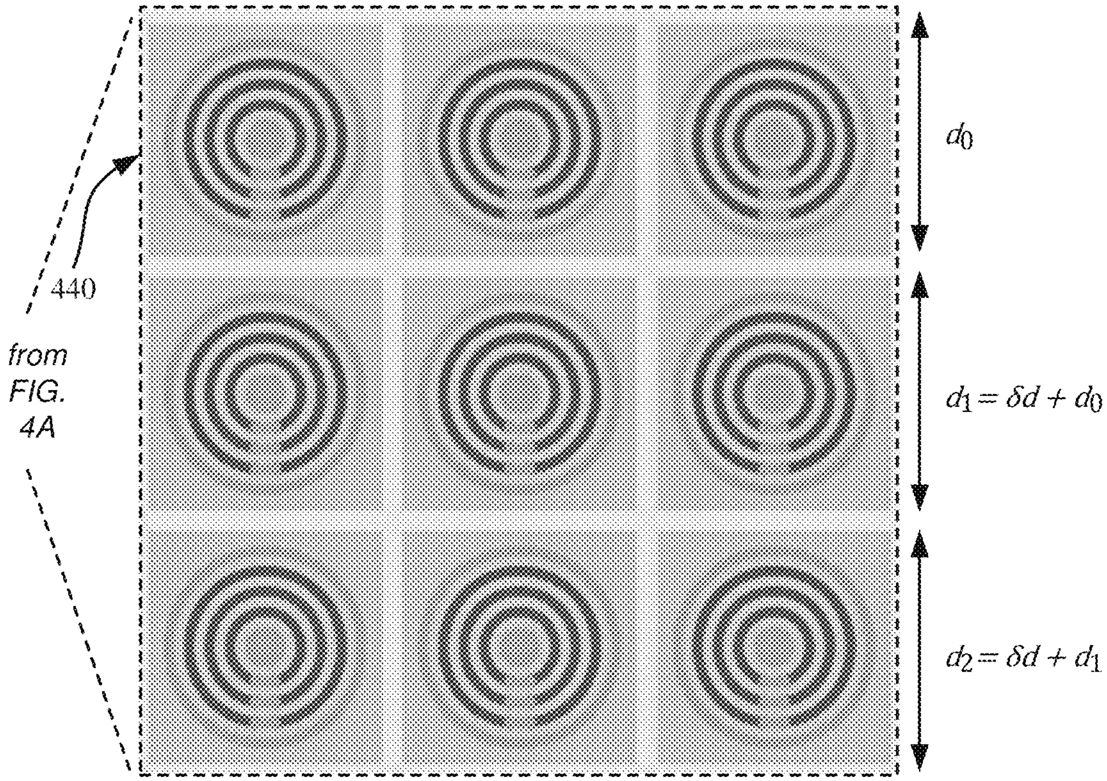
FIG. 12A is enlarged representation of an example 3×3 subarray of unit cells, showing different signal delays along vertically adjacent unit cells, in accordance with various example embodiments and implementations of the subject disclosure.
Figure 12B:
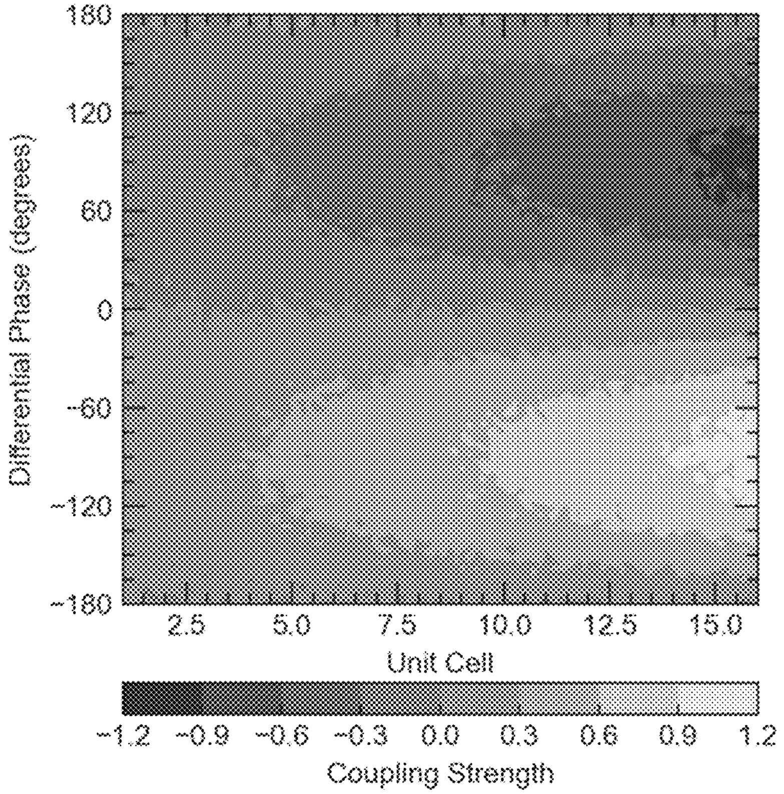
FIG. 12B is graphical representation of one example simulation that shows differential phase along a metasurface array of 16×1 elements for an incoming wave for varied coupling strength of a sensor, in accordance with various example embodiments and implementations of the subject disclosure.
Figure 13:
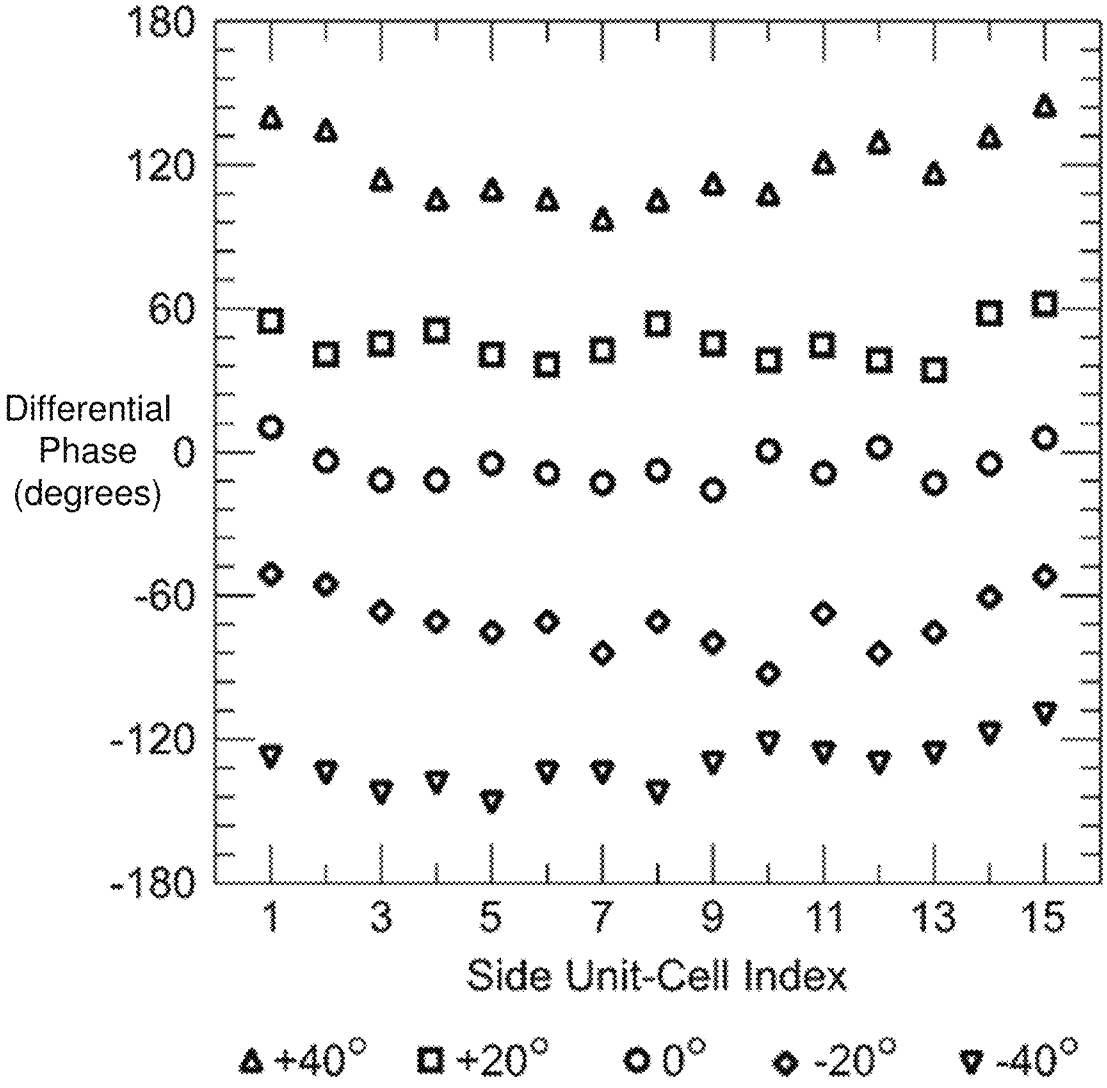
FIG. 13 is a graphical representation showing an example of differential phase values experienced by unit cells elements along a 16×1 array of elements of a reconfigurable intelligent surface, by which angle of arrival of an incoming signal can be determined, in accordance with various example embodiments and implementations of the subject disclosure.

The angle of arrival can be determined based on the delays between adjacent unit cells, such as a group of unit cells (a row or column) within the subarray 440 of FIG. 12A. in FIG. 12A, a unit cell in the first row may correspond to a delay of $d_0$, the next row a delay that corresponds to $d_1=\delta d+d_0$, $d_2\delta d+d_1$, and so on up to $d_n=\delta d+d_n-1$. Based on these differences, the angle of arrival can be determined. FIG. 13 graphically shows the simulated differential phase along the reconfigurable intelligent surface array of 16×1 elements for the incoming wave at five different incident angles. More particularly, to illustrate how the technology described herein can deduce information about a reconfigurable intelligent surface's incoming signal/channel, a row of sixteen elements was selected.

To obtain the results shown in FIG. 13, the phase differences in $S_{21}$ were simulated between pairs of consecutive elements for the incoming wave at different angles. For instance, the measurement labeled ‘2’ in FIG. 13 indicates the phase disparity between the fields sampled by the second and third substrate integrated waveguides of the unit cells in the selected row. As can be seen in FIG. 13, the phase difference varies based on the incident angle of the incoming wave, and is relatively linear for a given angle. The phase differences for a row (or column) can be averaged or otherwise combined to map to a more particular angle of arrival estimate, and the phase differences for more than one row or column can be evaluated. Although only five angles of arrival were simulated, other angles of arrival can be measured or simulated to obtain phase differential profiles that indicate what the angle of arrival is. Interpolation between the phase differences of two simulated or known for angles of arrival also can be used to estimate phase differences for angles of arrival between those two.

As mentioned, other factors, such as the strength of the incoming wave can also be studied from the magnitude of $S_{21}$. In any event, the sampled signals obtained from the substrate integrated waveguides integrated with the unit cells in the reconfigurable intelligent surface architecture can be used to extract valuable information regarding the signals hitting the reconfigurable intelligent surface.

It should be noted that more valuable information can be obtained by using the signal readouts from more unit cells. However, if only a row or column of adjacent cells are used for evaluation, substrate integrated waveguides may not be needed for the non-evaluated unit cells. Still further, while the phase differences of adjacent cells were evaluated with respect to FIGS. 12B and 13, information can be obtained from non-adjacent cells, e.g., phase differences between the first and third unit cells, the third and fifth unit cells and so on can be used to estimate an angle of arrival, although likely somewhat less accurately.

One or more example embodiments can be embodied in a system, such as described and represented herein. The system can include a reconfigurable intelligent surface comprising a unit cell that redirects an incoming electromagnetic signal as a redirected electromagnetic signal. The unit cell can include a metallic element pattern that resonates at a frequency corresponding to the incoming electromagnetic signal, and a variable tuning device, associated with the reflective metallic element pattern, that can be controllable to alter a phase of the redirected electromagnetic signal. The unit cell can include interconnects coupled to the variable tuning device; The unit cell can include a substrate supporting the reflective metallic element pattern, a ground plane beneath the substrate, and a substrate integrated waveguide beneath the ground plane, including side vias that enclose sides of the substrate integrated waveguide with respect to the frequency corresponding to the incoming electromagnetic signal, an upper metallic surface, and a lower metallic surface, in which the interconnects pass through the substrate integrated waveguide. The unit cell can include a sensor device, within the substrate integrated waveguide and proximate to the interconnects, that detects coupling strength data representative of information of the incoming electromagnetic signal, and an electrical sensing contact, electrically coupled to the sensor device, that provides a signal readout representative of the information of the incoming electromagnetic signal.

The upper metallic surface of the substrate integrated waveguide can include the ground plane.

The sensor device can surround at least part of a periphery around the interconnects.

The sensor device can include a first sensor element that detects higher coupling strength data representative of a coupling strength higher than a first specified coupling strength, and a second sensor element that detects lower coupling strength data representative of a coupling strength lower than a second specified coupling strength.

The first sensor element can be wider than second sensor element and first sensor element can be positioned further from the interconnects.

The sensor device can include a first sensor element that detects higher coupling strength data representative of a coupling strength higher than a first specified coupling strength, a second sensor element that detects medium coupling strength data representative of a coupling strength between the first specified coupling strength and a second specified couple strength lower than the first specified coupling strength, and a third sensor element that detects lower coupling strength data representative of a coupling strength lower than the second specified coupling strength.

The metallic element pattern can include a metallization layer including a metal outer ring, a metal inner patch, and a metal portion between the outer ring and the inner patch, wherein the metal outer ring, a metal inner patch, and a metal portion can be insulated from one another. The variable tuning device can include a phase change material beneath the metallization layer, including a penannular ring area positioned between the metal outer ring and the metal inner patch, the penannular ring area coupled, on one end, to one side of the metal portion, and coupled, on an opposite end opposite the one end, to an opposite side of the metal portion opposite the one side, and a heating element that can be controlled to determine a phase shift of the unit cell, based on heating the phase change material to a conductive state that electrically couples the one end of the penannular ring area to the opposite end of the penannular ring area via the metal portion, or to a resistive state that electrically decouples the one end of the penannular ring area from the opposite end of the penannular ring area.

The metal portion can be a first metal portion, the one side of the first metal portion can include a first side, the opposite side of the first metal portion can include a first opposite side, the penannular ring area can be a first penannular ring area, the one end of the first penannular ring area can be a first end of the first penannular ring area, the opposite end of the first penannular ring area can be a first opposite end of the penannular ring area, the heating element can be a first heating element, the conductive state can be a first conductive state, the resistive state can be a first resistive state. The system further can include a second metal portion between the first metal portion and the inner patch, wherein the second metal portion can be insulated from the first metal portion, a second penannular ring area of the phase change material positioned between the first penannular ring area and the metal inner patch, the second penannular ring area coupled, on a second end, to a second side of the second metal portion, and coupled, on a second opposite end opposite the second end, to a second opposite side of the second metal portion opposite the second side, and a second heating element that can be controlled to determine the phase shift of the unit cell, based on heating the phase change material to a second conductive state that electrically couples the second end of the second penannular ring area to the second opposite end of the second penannular ring area via the second metal portion, or to a second resistive state that electrically decouples the second end of the penannular ring area from the second opposite end of the second penannular ring area.

The system further can include a third metal portion between the second metal portion and the inner patch in which the third metal portion can be insulated from the second metal portion, a third penannular ring area of the phase change material positioned between the second penannular ring area and the metal inner patch, the third penannular ring area coupled, on a third end, to a third side of the third metal portion, and coupled, on a third opposite end opposite the third end, to a third opposite side of the third metal portion opposite the third side, and a third heating element that can be controlled to determine the phase shift of the unit cell, based on heating the phase change material to a third conductive state that electrically couples the third end of the third penannular ring area to the third opposite end of the third penannular ring area via the third metal portion, or to a third resistive state that electrically decouples the third end of the penannular ring area from the third opposite end of the third penannular ring area.

The signal readout representative of the information of the incoming electromagnetic signal can be usable to detect differential phase of the unit cell relative to an adjacent unit cell of the reconfigurable intelligent surface.

Figure 14:
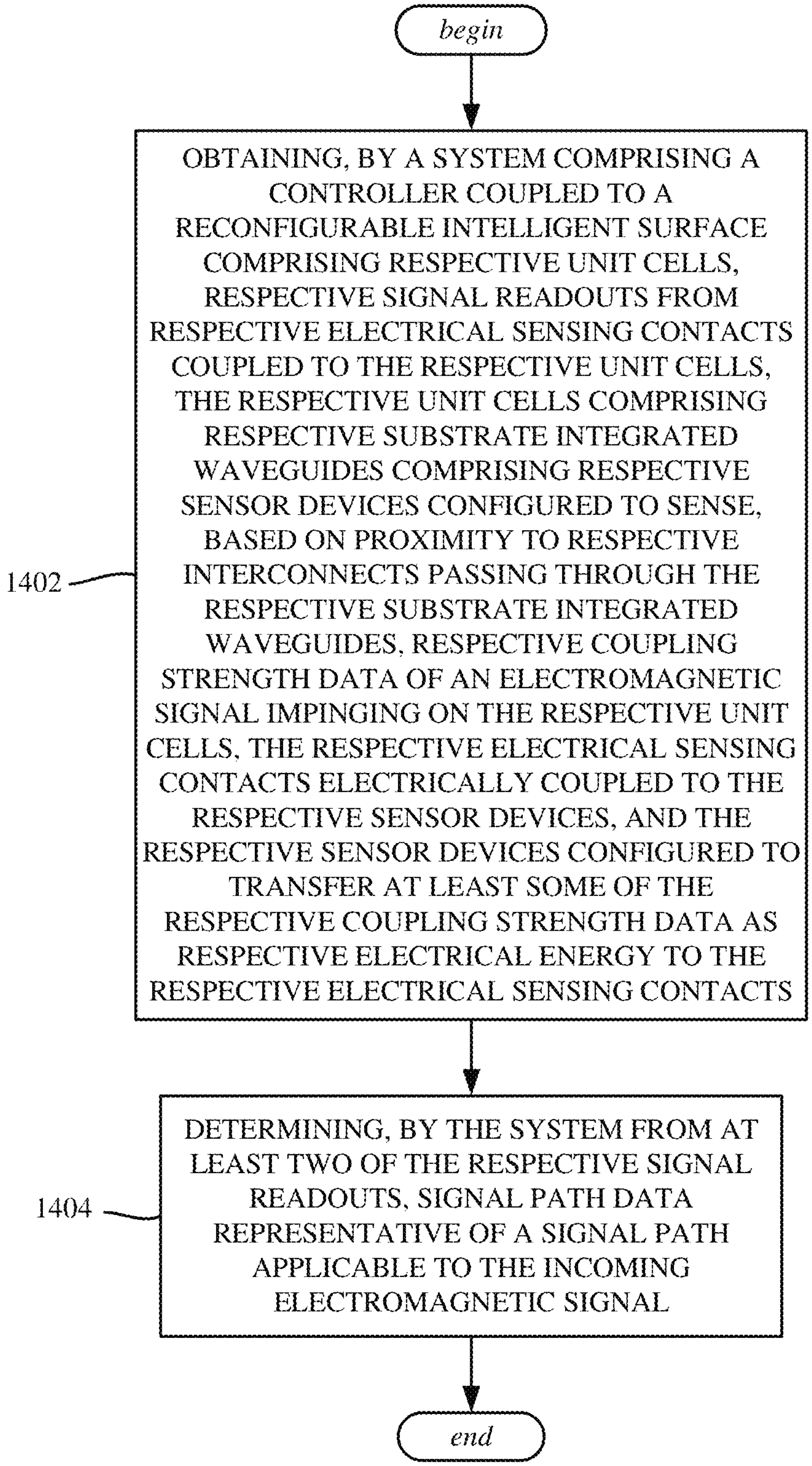
FIG. 14 is a flow diagram showing example operations related to obtaining signal readouts from electrical sensing contacts of unit cells, and determining signal path data with respect to an incoming electromagnetic signal based on the signal readouts, in accordance with various example embodiments and implementations of the subject disclosure.

One or more example aspects, such as corresponding to example operations of a method, or a system/a machine-readable medium having executable instructions that, when executed by a processor, facilitate performance of the operations, can be represented in FIG. 14. Example operation 1402 represents obtaining, by a system comprising a controller coupled to a reconfigurable intelligent surface comprising respective unit cells, respective signal readouts from respective electrical sensing contacts coupled to the respective unit cells, the respective unit cells comprising respective substrate integrated waveguides comprising respective sensor devices configured to sense, based on proximity to respective interconnects passing through the respective substrate integrated waveguides, respective coupling strength data of an electromagnetic signal impinging on the respective unit cells, the respective electrical sensing contacts electrically coupled to the respective sensor devices, and the respective sensor devices configured to transfer at least some of the respective coupling strength data as respective electrical energy to the respective electrical sensing contacts. Example operation 1404 represents determining, by the system from at least two of the respective signal readouts, signal path data representative of a signal path applicable to the incoming electromagnetic signal.

Determining the signal path data can include determining at least one of: phase differential data between at least two adjacent unit cells of the respective unit cells, or differential delay data between the at least two adjacent unit cells of the respective unit cells.

Determining the signal path data can include determining at least one of: signal strength data representative of a signal strength of the incoming electromagnetic signal, or angle of arrival data representative of an angle of arrival of the incoming electromagnetic signal.

The respective coupling strength data can include respective high coupling strength data, respective medium coupling strength data, and respective low coupling strength data, and further operations can include selecting, by the system, at least one of: the respective high coupling strength data, the respective medium coupling strength data, or the respective low coupling strength data based on respective variation data of the coupling strength data between the at least two of the respective signal readouts.

The respective unit cells of the reconfigurable intelligent surface can be arranged as an array comprising rows of the unit cells, and further operations can include selecting, by the system from the respective unit cells, a row of the unit cells, wherein the determining of the signal path data can include obtaining respective phase differential values, based on respective phase angle differences between respective adjacent pairs of at least part of the row of the unit cells, and estimating the signal path data based on the respective phase differential values.

Selecting the row can be based on respective variation data representative of coupling strength difference data representative of a difference between the adjacent pairs of the at least part of the row of the unit cells.

Selecting the row can include selecting a first row, wherein the signal path data can include first signal path data representative of a first signal path determined based on the first row, and further operations can include selecting, by the system from the respective unit cells, a second row of the unit cells other than the first row, determining, by the system based on the second row, second signal path data representative of a second signal path applicable to the incoming electromagnetic signal, and validating the first signal path data based on the second signal path data.

One or more example embodiments can be embodied in a unit cell, such as described and represented herein. The unit cell can include a reflective metallic element pattern that resonates at a frequency corresponding to an electromagnetic signal impinging on the unit cell, a heater network that can be controllable to alter a phase of a redirected electromagnetic signal reflected by the unit cell based on changing conductive or non-conductive states of one or more portions of phase change material beneath the reflective metallic element pattern, a substrate integrated waveguide, comprising an upper metallic surface, side vias that enclose sides of the substrate integrated waveguide with respect to the frequency corresponding to the incoming electromagnetic signal, and a lower metallic surface, interconnects through the substrate integrated waveguide that contain energy corresponding to the electromagnetic signal, a sensor device in the substrate integrated waveguide that detects at least some of the energy corresponding to the electromagnetic signal contained in the interconnects as coupling strength data, and an electrical sensing contact electrically coupled to the sensor device to output electrical information representative of the incoming electromagnetic signal.

The sensor device can surround at least part of a periphery around the interconnects.

The sensor device can include a first sensor element that detects the coupling strength data as higher coupling strength data, a second sensor element that detects the coupling strength data as medium coupling strength data, and a third sensor element that detects the coupling strength data as lower coupling strength data.

As can be seen, the technology described herein is directed to an intelligent reconfigurable surface arranged with unit cells that can sense the energy corresponding to sensed coupling strength of an incoming electromagnetic wave, with most of the incoming electromagnetic wave reflected to an intended target. The extracted signal information can be used to determine signal path/channel information for the currently sensed environment, including the signal magnitude of the portion captured, and the angle of arrival of the incoming electromagnetic wave. This information can be used to adjust the phases of the unit cells to accurately determine the shape and/or direction of the reflected signal. Through a practical design based on substrate integrated waveguides, valuable current channel information can be estimated for use in improving the performance of intelligent reconfigurable surfaces.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

a reconfigurable intelligent surface comprising a unit cell that redirects an incoming electromagnetic signal as a redirected electromagnetic signal, the unit cell comprising:

a metallic element pattern that resonates at a frequency corresponding to the incoming electromagnetic signal;

a variable tuning device, associated with the reflective metallic element pattern, that is controllable to alter a phase of the redirected electromagnetic signal;

interconnects coupled to the variable tuning device;

a substrate supporting the reflective metallic element pattern;

a ground plane beneath the substrate;

a substrate integrated waveguide beneath the ground plane, comprising side vias that enclose sides of the substrate integrated waveguide with respect to the frequency corresponding to the incoming electromagnetic signal, an upper metallic surface, and a lower metallic surface, wherein the interconnects pass through the substrate integrated waveguide;

a sensor device, within the substrate integrated waveguide and proximate to the interconnects, that detects coupling strength data representative of information of the incoming electromagnetic signal; and an electrical sensing contact, electrically coupled to the sensor device, that provides a signal readout representative of the information of the incoming electromagnetic signal.

2. The system of claim 1, wherein the upper metallic surface of the substrate integrated waveguide comprises the ground plane.

3. The system of claim 1, wherein the sensor device surrounds at least part of a periphery around the interconnects.

4. The system of claim 1, wherein the sensor device comprises a first sensor element that detects higher coupling strength data representative of a coupling strength higher than a first specified coupling strength, and a second sensor element that detects lower coupling strength data representative of a coupling strength lower than a second specified coupling strength.

5. The system of claim 1, wherein the first sensor element is wider than second sensor element and first sensor element is positioned further from the interconnects.

6. The system of claim 1, wherein the sensor device comprises a first sensor element that detects higher coupling strength data representative of a coupling strength higher than a first specified coupling strength, a second sensor element that detects medium coupling strength data representative of a coupling strength between the first specified coupling strength and a second specified couple strength lower than the first specified coupling strength, and a third sensor element that detects lower coupling strength data representative of a coupling strength lower than the second specified coupling strength.

7. The system of claim 1, wherein the metallic element pattern comprises a metallization layer comprising a metal outer ring, a metal inner patch, and a metal portion between the outer ring and the inner patch, wherein the metal outer ring, a metal inner patch, and a metal portion are insulated from one another, and wherein the variable tuning device comprises:

a phase change material beneath the metallization layer, comprising a penannular ring area positioned between the metal outer ring and the metal inner patch, the penannular ring area coupled, on one end, to one side of the metal portion, and coupled, on an opposite end opposite the one end, to an opposite side of the metal portion opposite the one side; and a heating element that is controlled to determine a phase shift of the unit cell, based on heating the phase change material to a conductive state that electrically couples the one end of the penannular ring area to the opposite end of the penannular ring area via the metal portion, or to a resistive state that electrically decouples the one end of the penannular ring area from the opposite end of the penannular ring area.

8. The system of claim 7, wherein the metal portion is a first metal portion, wherein the one side of the first metal portion comprises a first side, wherein the opposite side of the first metal portion comprises a first opposite side, wherein the penannular ring area is a first penannular ring area, wherein the one end of the first penannular ring area is a first end of the first penannular ring area, wherein the opposite end of the first penannular ring area is a first opposite end of the penannular ring area, wherein the heating element is a first heating element, wherein the conductive state is a first conductive state, wherein the resistive state is a first resistive state, and further comprising:

a second metal portion between the first metal portion and the inner patch, wherein the second metal portion is insulated from the first metal portion;

a second penannular ring area of the phase change material positioned between the first penannular ring area and the metal inner patch, the second penannular ring area coupled, on a second end, to a second side of the second metal portion, and coupled, on a second opposite end opposite the second end, to a second opposite side of the second metal portion opposite the second side; and a second heating element that is controlled to determine the phase shift of the unit cell, based on heating the phase change material to a second conductive state that electrically couples the second end of the second penannular ring area to the second opposite end of the second penannular ring area via the second metal portion, or to a second resistive state that electrically decouples the second end of the penannular ring area from the second opposite end of the second penannular ring area.

9. The system of claim 8, further comprising:

a third metal portion between the second metal portion and the inner patch, wherein the third metal portion is insulated from the second metal portion;

a third penannular ring area of the phase change material positioned between the second penannular ring area and the metal inner patch, the third penannular ring area coupled, on a third end, to a third side of the third metal portion, and coupled, on a third opposite end opposite the third end, to a third opposite side of the third metal portion opposite the third side; and a third heating element that is controlled to determine the phase shift of the unit cell, based on heating the phase change material to a third conductive state that electrically couples the third end of the third penannular ring area to the third opposite end of the third penannular ring area via the third metal portion, or to a third resistive state that electrically decouples the third end of the penannular ring area from the third opposite end of the third penannular ring area.

10. The system of claim 1, wherein the signal readout representative of the information of the incoming electromagnetic signal is usable to detect differential phase of the unit cell relative to an adjacent unit cell of the reconfigurable intelligent surface.

11. A method, comprising:

obtaining, by a system comprising a controller coupled to a reconfigurable intelligent surface comprising respective unit cells, respective signal readouts from respective electrical sensing contacts coupled to the respective unit cells, the respective unit cells comprising respective substrate integrated waveguides comprising respective sensor devices configured to sense, based on proximity to respective interconnects passing through the respective substrate integrated waveguides, respective coupling strength data of an electromagnetic signal impinging on the respective unit cells, the respective electrical sensing contacts electrically coupled to the respective sensor devices, and the respective sensor devices configured to transfer at least some of the respective coupling strength data as respective electrical energy to the respective electrical sensing contacts; and determining, by the system from at least two of the respective signal readouts, signal path data representative of a signal path applicable to the incoming electromagnetic signal.

12. The method of claim 11, wherein the determining of the signal path data comprises determining at least one of: phase differential data between at least two adjacent unit cells of the respective unit cells, or differential delay data between the at least two adjacent unit cells of the respective unit cells.

13. The method of claim 11, wherein the determining of the signal path data comprises determining at least one of: signal strength data representative of a signal strength of the incoming electromagnetic signal, or angle of arrival data representative of an angle of arrival of the incoming electromagnetic signal.

14. The method of claim 11, wherein the respective coupling strength data comprises respective high coupling strength data, respective medium coupling strength data, and respective low coupling strength data, and further comprising selecting, by the system, at least one of: the respective high coupling strength data, the respective medium coupling strength data, or the respective low coupling strength data based on respective variation data of the coupling strength data between the at least two of the respective signal readouts.

15. The method of claim 11, wherein the respective unit cells of the reconfigurable intelligent surface are arranged as an array comprising rows of the unit cells, and further comprising selecting, by the system from the respective unit cells, a row of the unit cells, wherein the determining of the signal path data comprises obtaining respective phase differential values, based on respective phase angle differences between respective adjacent pairs of at least part of the row of the unit cells, and estimating the signal path data based on the respective phase differential values.

16. The method of claim 15, wherein the selecting of the row is based on respective variation data representative of coupling strength difference data representative of a difference between the adjacent pairs of the at least part of the row of the unit cells.

17. The method of claim 15, wherein the selecting of the row comprises selecting a first row, wherein the signal path data comprises first signal path data representative of a first signal path determined based on the first row, and further comprising selecting, by the system from the respective unit cells, a second row of the unit cells other than the first row, determining, by the system based on the second row, second signal path data representative of a second signal path applicable to the incoming electromagnetic signal, and validating the first signal path data based on the second signal path data.

18. A unit cell, comprising:

a reflective metallic element pattern that resonates at a frequency corresponding to an electromagnetic signal impinging on the unit cell;

a heater network that is controllable to alter a phase of a redirected electromagnetic signal reflected by the unit cell based on changing conductive or non-conductive states of one or more portions of phase change material beneath the reflective metallic element pattern;

a substrate integrated waveguide, comprising an upper metallic surface, side vias that enclose sides of the substrate integrated waveguide with respect to the frequency corresponding to the incoming electromagnetic signal, and a lower metallic surface;

interconnects through the substrate integrated waveguide that contain energy corresponding to the electromagnetic signal;

a sensor device in the substrate integrated waveguide that detects at least some of the energy corresponding to the electromagnetic signal contained in the interconnects as coupling strength data; and an electrical sensing contact electrically coupled to the sensor device to output electrical information representative of the incoming electromagnetic signal.

19. The unit cell of claim 18, wherein the sensor device surrounds at least part of a periphery around the interconnects.

20. The unit cell of claim 18, wherein the sensor device comprises a first sensor element that detects the coupling strength data as higher coupling strength data, a second sensor element that detects the coupling strength data as medium coupling strength data, and a third sensor element that detects the coupling strength data as lower coupling strength data.

* * * * *